United States Patent
Huang et al.

(10) Patent No.: US 12,479,986 B2
(45) Date of Patent: Nov. 25, 2025

(54) SOFT AND NON-STICKY OR GREASY SOFT TOUCH FEEL POLYMER COMPOSITION

(71) Applicant: SABIC GLOBAL TECHNOLOGIES B.V., Bergen op Zoom (NL)

(72) Inventors: Ting Huang, Shanghai (CN); Weisong Gao, Shanghai (CN); Chaodong Jiang, Shanghai (CN); Yubin Bao, Shanghai (CN); Yunbo Zhang, Shanghai (CN); Chunfa Li, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 728 days.

(21) Appl. No.: 17/788,576

(22) PCT Filed: Dec. 22, 2020

(86) PCT No.: PCT/EP2020/087669
§ 371 (c)(1),
(2) Date: Jun. 23, 2022

(87) PCT Pub. No.: WO2021/130247
PCT Pub. Date: Jul. 1, 2021

(65) Prior Publication Data
US 2023/0044121 A1    Feb. 9, 2023

(30) Foreign Application Priority Data

Dec. 26, 2019  (WO) ............... PCT/CN2019/128493
Mar. 18, 2020  (EP) ..................................... 20164008

(51) Int. Cl.
| | |
|---|---|
| *C08L 23/12* | (2006.01) |
| *C08K 3/26* | (2006.01) |
| *C08L 23/06* | (2006.01) |
| *C08L 23/0807* | (2025.01) |

(52) U.S. Cl.
CPC ............ *C08L 23/0815* (2013.01); *C08K 3/26* (2013.01); *C08K 2003/265* (2013.01); *C08L 23/06* (2013.01); *C08L 23/12* (2013.01); *C08L 2205/025* (2013.01)

(58) Field of Classification Search
CPC ...... C08L 23/12; C08L 23/06; C08L 23/0815; C08L 2205/025; C08K 2003/265; C08K 3/26
See application file for complete search history.

(56) References Cited

U.S. PATENT DOCUMENTS

| | | | |
|---|---|---|---|
| 4,585,604 A | 4/1986 | Okuyama et al. | |
| 5,017,714 A | 5/1991 | Welborn, Jr. | |
| 6,696,520 B1 | 2/2004 | Pellegatti et al. | |
| 6,869,993 B2* | 3/2005 | Watanabe | C08K 5/20 524/451 |
| 10,414,140 B2* | 9/2019 | Zacarias | B32B 27/32 |
| 2003/0158343 A1 | 8/2003 | Kijima | |
| 2005/0014902 A1* | 1/2005 | McMahon | C08F 255/04 525/242 |
| 2011/0306715 A1 | 12/2011 | Ashish et al. | |

FOREIGN PATENT DOCUMENTS

| | | | | |
|---|---|---|---|---|
| CN | 105482239 A | * | 4/2016 | .......... C08L 23/0815 |
| EP | 1655341 A1 | | 5/2006 | |
| JP | 2005002308 A | | 1/2005 | |
| JP | 4190942 X | | 12/2005 | |
| WO | 2007082571 A1 | | 7/2007 | |
| WO | 2009146438 A1 | | 12/2009 | |

OTHER PUBLICATIONS

CN-105482239-A (Apr. 13, 2016); machine translation. (Year: 2016).*
OmyaCarb 2T Product Information Sheet (May 2007). (Year: 2007).*
Vistamaxx Performance Polymer 6202 Product Datasheet (Jul. 2020). (Year: 2020).*
ExxonMobil PP7032E3 Product Datasheet (Aug. 2015). (Year: 2015).*
International Search Report & Written Opinion International Application No. PCT/EP2020/087669; International Filing Date: Dec. 22, 2020; Date of Mailing: Mar. 16, 2021; 12 pages.

* cited by examiner

*Primary Examiner* — Rip A Lee
(74) *Attorney, Agent, or Firm* — CANTOR COLBURN LLP

(57) ABSTRACT

The present invention relates to a polymer composition comprising polyolefin based elastomer, a polyolefin and CaCO₃. The present invention further relates to the use of said polymer composition. The present invention further relates to a process for the preparation of an article comprising said polymer composition. The present invention further relates to the use of said polymer composition.

17 Claims, No Drawings

SOFT AND NON-STICKY OR GREASY SOFT TOUCH FEEL POLYMER COMPOSITION

CROSS REFERENCE TO RELATED APPLICATIONS

This application is a National Stage application of PCT/EP2020/087669, Dec. 22, 2020, which claims the benefit of National Stage Application No. PCT/CN2019/128493, filed Dec. 26, 2019, and European Application No. 20164008.3, filed Mar. 18, 2020, all of which are incorporated by reference in their entirety herein.

The present invention relates to a polymer composition comprising polyolefin based elastomer, a polyolefin and $CaCO_3$. The present invention further relates to a process for the preparation of an article comprising said polymer composition. The present invention further relates to the use of said polymer composition.

Polymer compositions with a soft touch feel and/or non-sticky and greasy touch feel give users a pleasant feeling upon touching. This type of polymer compositions are widely used in various domains of industry, for instance, for automotive interiors, as handle parts of tools and for home appliances. Especially when used in a handle part, the polymer compositions not only provide a pleasant touch but also improve the grip of the users of the tool/appliance. Such polymer composition, especially a polymer composition based on polyolefin having a soft touch feel and/or non-sticky touch feel is known in the art. For example:

EP1655341A1 discloses a composition comprising a first polymer composition, a second polymer composition and a hydrocarbon resin. The composition has a desirable balance of softness, flexibility and strength.

U.S. Pat. No. 6,696,520B1 discloses an elastomeric thermoplastic polyolefin composition comprising a heterophasic olefin polymer composition, an elastomeric polymer and optionally a crystalline copolymer of ethylene with propylene or with a $CH_2$=CHR α-olefin. The elastomeric thermoplastic polyolefin composition has higher softness and less stickiness.

US20030158343 discloses a resin composition comprising a propylene polymer and an olefin-based polymer. The resin composition can be molded to the molded articles which is environmentally friendly, superior in little sticking, softness and transparency with excellent molding ability.

Polyolefin based elastomer is often present in this type of polymer composition to provide the soft touch feature. However, the presence of polyolefin based elastomer may also cause an unpleasant greasy feel.

Hence it is It is an object of the present invention to provide a polymer composition with a soft and non-sticky as well as a non-greasy touch feel.

This object is achieved by a polymer composition comprising polyolefin based elastomer, a polyolefin and $CaCO_3$, wherein the amount of the polyolefin is in the range from 1.2 to 8.1 wt % based on the total amount of the polymer composition, wherein the polyolefin is a polypropylene or a polyethylene, wherein the amount of the polyolefin based elastomer is in the range from 31 to 73 wt % based on the total amount of the polymer composition, wherein the weight ratio between $CaCO_3$ and the total amount of the polyolefin and the polyolefin based elastomer is in the range from 0.24 to 1.63, wherein the melt flow index (MFI) of the polymer composition is in the range from 3 to 68 dg/min as measured according to ISO1133-1:2011 at 190° C. with a 2.16 kg load.

It was surprisingly found that the polymer composition according to the present invention provides a soft and non-sticky and a non-greasy touch feel.

In addition, when the polymer composition according to the invention is used in an article, it is often used in combination with another part with higher stiffness. Such part with higher stiffness could provide structural support to the polymer composition according to the invention and is commonly prepared from polyolefins. The polymer composition of the invention comprises a polyolefin which is preferably the same type as the polyolefin of the part with higher stiffness, e.g. when the part with higher stiffness is a polypropylene, the polyolefin in the polymer composition is preferably also a polypropylene. Higher stiffness is meant the modulus of the part is at least 1261 MPa as measured according to ISO178:2010.

Polyolefin Based Elastomer

The polyolefin based elastomer according to the present invention is preferably at least one ethylene-α-olefin copolymer wherein the α-olefin has 3 to 20 carbon atoms, for example the ethylene-α-olefin copolymer is an ethylene-propylene copolymer, for example the ethylene-α-olefin copolymer is an ethylene-butene copolymer, for example the ethylene-α-olefin copolymer is an ethylene-hexene copolymer, for example the ethylene-α-olefin copolymer is an ethylene-octene copolymer or a combination thereof.

Preferably the polyolefin based elastomer is at least one ethylene copolymer selected from the group consisting of ethylene-propylene copolymer, ethylene-butene copolymer, ethylene-hexene copolymer, ethylene-octene copolymer or a mixture thereof, preferably the polyolefin based elastomer is at least one ethylene copolymer selected from ethylene-butene copolymer, ethylene-hexene copolymer, ethylene-octene copolymer or a mixture thereof, most preferably the polyolefin based elastomer is at least one ethylene-octene copolymer.

The polyolefin based elastomer according to the present invention preferably has a shore A hardness (1 second) in the range from 44 to 101, preferably from 48 to 92, more preferably from 51 to 79, more preferably from 53 to 70 as measured according to ASTM D2240-15.

The density of the polyolefin based elastomer is preferably in the range from 849 to 892 $kg/m^3$, more preferably from 853 to 880 $kg/m^3$, even more preferably from 853 to 877 $kg/m^3$ as measured according to ASTM D792-13.

The glass transition temperature of the polyolefin based elastomer is preferably in the range from −45 to −65° C., more preferably in the range from −50 to −60° C. as measured according to ISO 11357-2:2013.

The melt flow index (MFI) of the polyolefin based elastomer is preferably in the range from 0.1 to 45 dg/min, preferably in the range from 0.5 to 39 dg/min, more preferably in the range from 0.9 to 35 dg/min as measured according to ISO 1133-1:2011 at 190° C. with a 2.16 kg load.

The polyolefin based elastomer may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The polyolefin based elastomer may also be prepared using traditional types of heterogeneous multi-sited Ziegler-Natta catalysts.

Polyolefin

The polyolefin according to the present invention is a polypropylene or a polyethylene.

Preferably the polypropylene according to the invention has a melt flow index (MFI) in the range from 3 to 200 dg/min, preferably from 5 to 100 dg/min, more preferably from 15 to 75 dg/min as measured according ISO 1133-1: 2011 at 230° C. with a 2.16 kg load. The polypropylene may be a propylene homopolymer or a propylene random copolymer or a heterophasic propylene copolymer. Preferably the polypropylene is a propylene homopolymer wherein the polypropylene comprises only moieties derived from propylene.

The polyethylene according to the invention is preferably a high density polyethylene (HDPE). The density of the polyethylene is preferably in the range from 0.920 to 0.972 g/cm$^3$ according to ASTM D792-13. The MFI of the high density polyethylene is in the range from according to 0.5 to 45.3 dg/min according to ISO 1133-1:2011 at 190° C. with a 2.16 kg load.

CaCO$_3$

CaCO$_3$ is widely used as a filler for polyolefin compositions. In the present invention, CaCO$_3$ in the present invention is preferably used in powder form for the preparation of the polymer composition. Preferably the average particle size D50 of CaCO$_3$ is in the range from 0.3 to 5.6 µm, preferably in the range from 0.8 to 4.2 µm, more preferably in the range from 1.2 to 2.8 µm as measured according to as measured according to ISO 13317-3:2001, sedimentation analysis, Stockes' law. During the preparation of the polymer composition, CaCO$_3$ is easier to be dispersed homogeneously in the polymer composition if CaCO$_3$ is provided in powder form in the aforementioned size range. Homogeneous dispersion of CaCO$_3$ leads to better touch feel and mechanical performance of the polymer composition.

Polymer Composition

The amount of the polyolefin in the polymer composition is in the range from 1.2 to 8.1 wt %, preferably in the range from 2.1 to 8.0 wt %, more preferably in the range from 5.9 to 7.9 wt % based on the total amount of the polymer composition. The amount of the polyolefin based elastomer is in the range from 31 to 73 wt %, preferably in the range from 43 to 71 wt %, more preferably in the range from 53 to 73 wt % based on the total amount of the polymer composition. The weight ratio between CaCO$_3$ and the total amount of the polyolefin and the polyolefin based elastomer is in the range from 0.24 to 1.63, preferably in the range from 0.27 to 0.80, more preferably from 0.29 to 0.63.

Preferably the amount of CaCO$_3$ in the polymer composition is in the range from 18.5 to 64.7 wt %, preferably from 20.3 to 45.2 wt %, more preferably from 23.0 to 35.8 wt %, based on the total amount of the polymer composition.

The total amount of the polyolefin, polyolefin based elastomer and CaCO$_3$ is preferably at least 95 wt %, preferably at least 97 wt %, more preferably at least 98 wt % based on the total amount of the polymer composition.

The MFI of the polymer composition according to the invention is in the range from 3.0 to 68 dg/min, preferably in the range from 8.0 to 44 dg/min, more preferably in the range from 10 to 24 dg/min as measured according to ISO1133-1:2011 at 190° C. with a 2.16 kg load.

The polymer composition according to the present invention can for example be prepared in an extrusion process by melt-mixing the polyolefin based elastomer, a polyolefin and CaCO$_3$ in a twin-screw extruder. The polymer composition according to the present invention may further comprise conventional additives, it is however preferred that if the polymer composition comprises talc, the amount of talc is preferably at most 7 wt %, more preferably at most 5 wt %, even more preferably at most 1 wt %, most preferably the polymer composition is free of talc since the presence of talc may cause unpleasant touch feel.

The present invention further relates to a process for the preparation of an article comprising the sequential steps of:
Providing the polymer composition according to the present invention;
Injecting the polymer composition according to the present invention into a mold to form the article.

The present invention further relates to the use of the polymer composition according to the present invention in the preparation of an article, preferably an automotive part or a handle part, for example an automotive interior part, for example a handle part of a tool, for example a handle part of a personal care device.

In one embodiment, the present invention further relates to an article obtained or obtainable by the process of the present invention, wherein the amount of the polymer composition according to the present invention is at least 95 wt %, preferably at least 98 wt % based on the total amount of the article.

In another embodiment, the present invention further relates to an article comprising the polymer composition according to the invention and a part with higher stiffness, wherein the modulus of the part with higher stiffness is at least 1261 MPa as measured according to ISO178:2010. Preferably the part with higher stiffness is prepared from polyolefin, wherein the polyolefin in the polymer composition is of the same type as the polyolefin from which the part with higher stiffness is prepared.

For the avoidance of any confusion, in the context of the present invention, the term "amount" can be understood as "weight"; "Melt flow index (MFI)" refers to the same physical property as "melt flow rate (MFR)".

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process. When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

Material

C30070D POE is a polyolefin based elastomer, which is commercially available from SABIC with grade name FOR- TIFY™ C30070D. C30070D POE is an ethylene-1-octene copolymer. The MFI of C30070D POE is 30.0 dg/min as measured according to ISO 1133-1:2011 at 190° C. with a 2.16 kg load. The density of C30070D POE is 868 kg/m³ as measured according to ASTM D792-13. The glass transition temperature of C30070D POE is −52° C. as measured according to ISO 11357-2:2013. C30070D POE has a Shore A hardness (1 s) of 68 as measured according to ASTM D2240-15.

C1055D POE is a polyolefin based elastomer, which is commercially available from SABIC with grade name FOR-TIFY™ C1055D. C1055D POE is an ethylene-1-octene copolymer. The MFI of C1055D POE is 1.0 dg/min as measured according to ISO 1133-1:2011 at 190° C. with a 2.16 kg load. The density of C1055D POE is 857 kg/m³ as measured according to ASTM D792-13. The glass transition temperature of C1055D POE is −59° C. as measured according to ISO 11357-2:2013. C1055D POE has a Shore A hardness (1s) of 55 as measured according to ASTM D2240-15.

PP595A is a propylene homopolymer, which is commercially available from SABIC with grade name PP 595A. The MFI of PP595A is 47 dg/min as measured according to ISO 1133-1:2011 at 230° C. with a 2.16 kg load The talc used for the examples was Jetfine® 3CA commercially available from Imerys Talc.

CaCO$_3$ as used in the present invention was Omyacarb 1T-CU, which is commercially available from Omya Minerals (Changshu) Co., Ltd. CaCO$_3$ was provided in powder form with a D50 value of 1.9 μm as measured according to ISO 13317-3:2001 (sedimentation analysis, Stockes' law).

Stabilizer: A small amount of stabilizer was present in all the examples to prevent the degradation of polyolefin based elastomer and polypropylene.

Specimen Preparation

Pellets of the examples were prepared by compounding the ingredients in a Coperion ZSK 26 twin screw extruder under the following settings:

Zone 1-9 temperature: 50° C.-80° C.-175° C.-175° C.-160° C.-160° C.-160° C.-150° C.-150° C.;
Throughput: 15 kg/h;
Rotation speed: 300 RPM.

Then the pellets of examples were provided to an injection molding machine (FANAC S-2000i type) to prepare specimens for the following measurements:

Shore A hardness measurement used specimens in a flat cylindrical shape with a height of 6 mm and a diameter of 28 mm.

Soft feel rating and non-sticky and greasy rating used specimens in a flat cuboid shape with dimensions of 60 mm*90 mm*1 mm.

Measurement Methods

MFI: ISO1133-1:2011 at 190° C. with a 2.16 kg load using the pellets from the compounding step.

Shore A hardness: ISO 868:2003 with 15 s.

Soft feel rating: Soft feel rating was determined by a panel of 10 experts in soft feel properties. Specifically, the experts felt the surface of the respective specimens and assigned it a soft feel rating 1 to 5, where a soft feel rating of 5 was the best and 1 was the worst. 10 specimens were evaluated for each example. The average value of soft feel rating from all the experts on all the specimens for each sample is given in table 1.

Non-sticky and greasy rating: Non-sticky and greasy rating was determined by a panel of 10 experts in stickiness and grease properties. Specifically, the experts felt the surface of the respective specimens and assigned it a non-sticky and greasy rating 1 to 5, where a non-sticky and greasy rating of 5 was the best and 1 was the worst. 10 specimens were evaluated for each example. The average value of non-sticky and greasy rating from all the experts on all the specimens for each sample is given in table 1.

Result

The formulation, Shore A hardness, soft feel rating and non-sticky and greasy rating of all the samples are present in Table 1:

| Sample | CE1 | CE2 | CE3 | IE1 | CE4 | CE5 | CE6 | IE2 | IE3 | IE4 | IE5 |
|---|---|---|---|---|---|---|---|---|---|---|---|
| C30070D POE (wt %) | 80 | 72.7 | 66.7 | 61.5 | 72.7 | 66.7 | 61.5 | 53.3 | 47.1 | 40 | 32 |
| C1055D POE (wt %) | 10 | 9.09 | 8.33 | 7.69 | 9.09 | 8.33 | 7.69 | 6.67 | 5.88 | 5 | 4 |
| Total POE (wt %) | 90 | 81.8 | 75 | 69.2 | 81.8 | 75 | 69.2 | 60 | 52.9 | 45 | 36 |
| PP595A (wt %) | 9.9 | 8.97 | 8.21 | 7.57 | 8.97 | 8.21 | 7.57 | 6.55 | 5.76 | 4.9 | 3.9 |
| Stabilizer (wt %) | 0.1 | 0.12 | 0.12 | 0.12 | 0.12 | 0.12 | 0.12 | 0.12 | 0.12 | 0.1 | 0.1 |
| CaCO3 (wt %) | | 9.09 | 16.7 | 23.1 | | | | 33.3 | 41.2 | 50 | 60 |
| Talc (wt %) | | | | | 9.09 | 16.7 | 23.1 | | | | |
| CaCO3/(PP + POE) | 0 | 0.10 | 0.20 | 0.30 | 0 | 0 | 0 | 0.50 | 0.70 | 1.00 | 1.50 |
| MFI (dg/min) | 17.4 | 17.3 | 17.9 | 16.8 | — | — | — | 16.6 | 16.0 | 14.9 | 11.9 |
| Shore A Hardness | 64 | 67 | 69 | 70 | 67.5 | 71 | 76 | 73.1 | 75.2 | 79 | 81 |
| Soft feel rating | 4.7 | 4.6 | 4.6 | 4.5 | 3.2 | 3 | 2.6 | 4 | 3.6 | 3.6 | 3.4 |
| Non-Sticky and Greasy rating | 1 | 1.8 | 2.5 | 3 | 2.6 | 3 | 3.8 | 3.8 | 4.5 | 4.7 | 4.8 |

As can be seen from Table 1, the examples according to the invention have a soft feel rating of higher than 3.4 and a non-sticky and greasy rating of higher than 2.8. Compositions with the amount of POE, polyolefin and CaCO$_3$ in the preferred amount as represented by IE1 and IE2 are especially preferred because their soft feel ratings are higher than 3.9 and their non-sticky and greasy ratings are higher than 2.9.

The invention claimed is:

1. A polymer composition, comprising:
a polyolefin based elastomer, a polyolefin, and CaCO$_3$;
wherein a total amount of the polyolefin based elastomer, the polyolefin, and CaCO$_3$ is at least 95 wt % based on a total amount of the polymer composition,
wherein an amount of the polyolefin is in a range from 1.2 to 8.1 wt % based on the on a total amount of the polymer composition,
wherein the polyolefin is a polypropylene or a polyethylene,
wherein an amount of the polyolefin based elastomer is in a range from 31 to 73 wt % based on the total amount of the polymer composition,
wherein a weight ratio between CaCO$_3$ and a total amount of the polyolefin and the polyolefin based elastomer is in a range from 0.24 to 1.63, and wherein a melt flow index (MFI) of the polymer composition is in a range from 3 to 68 dg/min as measured according to ISO1133-1:2011 at 190° C. with a 2.16 kg load.

2. The polymer composition according to claim 1, wherein the polyolefin based elastomer is at least one ethylene copolymer selected from the group consisting of ethylene-propylene copolymer, ethylene-1-butene copolymer, ethylene-1-hexene copolymer, ethylene-1-octene copolymer or a mixture thereof.

3. The polymer composition according to claim 1, wherein a MFI of the polyolefin based elastomer is in a range from 0.1 to 45 dg/min as measured according to ISO 1133-1:2011 at 190° C. with a 2.16 kg load.

4. The polymer composition according to claim 1, wherein a density of the polyolefin based elastomer is in a range from 849 to 892 kg/m$^3$ as measured according to ASTM D792-13.

5. The polymer composition according to claim 1, wherein the amount of the polyolefin is in the range from 2.1 to 8.0 wt % based on the total amount of the polymer composition.

6. The polymer composition according to claim 1, wherein an average particle size D50 of $CaCO_3$ is in a range from 0.3 to 5.6 μm as measured according to as measured according to ISO 13317-3:2001 (sedimentation analysis, Stockes' law).

7. The polymer composition according to claim 1, wherein an amount of $CaCO_3$ is in a range from 23.0 to 35.8 wt % based on the total amount of the polymer composition.

8. The polymer composition according to claim 1, wherein the amount of the polyolefin based elastomer is in the range from 53-73 wt % based on the total amount of the polymer composition.

9. The polymer composition according to claim 1, wherein the weight ratio between the $CaCO_3$ and the total amount of the polyolefin and the polyolefin based elastomer is in the range from 0.27 to 0.80.

10. The polymer composition according to claim 1, wherein a glass transition temperature of the polyolefin based elastomer is in a range from −45 to −65° C. as measured according to ISO 11357-2:2013.

11. The polymer composition according to claim 1, wherein the polyolefin is the polyethylene and a density of the polyethylene is in a range from 0.920 to 0.972 g/cm$^3$ according to ASTM D792-13.

12. The polymer composition according to claim 1, wherein the polyolefin is the polypropylene and an MFI of the polypropylene is in a range from 3 to 200 dg/min as measured according to ISO 1133-1:2011 at 230° C. with a 2.16 kg load.

13. An article comprising at least 88 wt % of the polymer composition of claim 1, based on a total amount of the article.

14. A process for the preparation of an article comprising the following steps:
providing the polymer composition of claim 1; and
injecting the polymer composition into a mold to form the article.

15. An article comprising the polymer composition of claim 1.

16. A polymer composition, comprising:
a polyolefin based elastomer, a polyolefin, and $CaCO_3$;
wherein an amount of the polyolefin is in a range from 1.2 to 8.1 wt % based on a total amount of the polymer composition;
wherein the polyolefin is a polypropylene or a polyethylene;
wherein an amount of the polyolefin based elastomer is in a range from 31 to 73 wt % based on a total amount of the polymer composition;
wherein a weight ratio between $CaCO_3$ and a total amount of the polyolefin and the polyolefin based elastomer is in a range from 0.24 to 1.63;
wherein a melt flow index (MFI) of the polymer composition is in a range from 3 to 68 dg/min as measured according to ISO1133-1:2011 at 190° C. with a 2.16 kg load; and,
wherein a glass transition temperature of the polyolefin based elastomer is in a range from −45 to −65° C. as measured according to ISO 11357-2:2013.

17. A polymer composition, comprising:
a polyolefin based elastomer, a polyolefin, and $CaCO_3$;
wherein an amount of the polyolefin is in a range from 1.2 to 8.1 wt % based on a total amount of the polymer composition,
wherein the polyolefin is a polypropylene or a polyethylene,
wherein an amount of the polyolefin based elastomer is in a range from 31 to 73 wt % based on the total amount of the polymer composition,
wherein the polyolefin based elastomer is at least one ethylene copolymer selected from the group consisting of: ethylene-1-butene copolymer, ethylene-1-hexene copolymer, ethylene-1-octene copolymer, and mixtures thereof,
wherein a weight ratio between $CaCO_3$ and a total amount of the polyolefin and the polyolefin based elastomer is in a range from 0.24 to 1.63, and
wherein a melt flow index (MFI) of the polymer composition is in a range from 3 to 68 dg/min as measured according to ISO1133-1:2011 at 190° C. with a 2.16 kg load.

* * * * *